United States Patent [19]

Scragg

[11] Patent Number: 4,804,065
[45] Date of Patent: Feb. 14, 1989

[54] DEVICE FOR DOSING A FLOWING FLUID

[76] Inventor: Edgar P. Scragg, 60 Mulder Street, Florida Park Extn 3, Florida, Transvaal Province, South Africa

[21] Appl. No.: 73,452

[22] Filed: Jul. 15, 1987

[30] Foreign Application Priority Data

Jul. 15, 1986 [ZA] South Africa .................. 86/5267

[51] Int. Cl.⁴ ............................................. F16N 11/00
[52] U.S. Cl. ......................................... 184/39; 222/94
[58] Field of Search ................. 184/39.1, 39, 55.1, 184/55.2; 222/94, 144.5, 136, 496, 497, 386.5, 129.2; 137/101.11, 564.5, 205.5, 484.4, 605; 251/285

[56] References Cited

U.S. PATENT DOCUMENTS

| | | | |
|---|---|---|---|
| 1,757,084 | 5/1930 | Hansen | 184/55.2 |
| 2,294,813 | 9/1942 | Taube, Jr. | 222/497 X |
| 3,135,356 | 6/1964 | Pohs | 184/55.2 |
| 4,174,767 | 11/1979 | Kramer | 184/39 X |
| 4,483,417 | 11/1984 | Mann | 184/55.2 |

FOREIGN PATENT DOCUMENTS

| | | | |
|---|---|---|---|
| 743403 | 9/1966 | Canada | 184/55.1 |
| 616459 | 7/1935 | Fed. Rep. of Germany | 222/144.5 |
| 1773459 | 3/1972 | Fed. Rep. of Germany | |
| 95402 | 1/1960 | Norway | 184/55.2 |
| 936956 | 9/1963 | United Kingdom | |
| 1214237 | 12/1970 | United Kingdom | |

*Primary Examiner*—Leonard E. Smith
*Attorney, Agent, or Firm*—Ladas & Parry

[57] ABSTRACT

A device for dosing a flowing fluid is disclosed, the device comprising a casing having an inlet and an outlet. Within the casing there is a supply of the additive with which the flowing fluid is to be dosed, the additive being within a bag. The bag is mounted on a plate which has a passage in it. A needle valve controls flow of additive through the passage. When fluid flows from the inlet through the cylindrical gap to the outlet, the head of the valve is urged by the flowing liquid in the direction which opens the passage. This allows additive to flow from the bag under the influence of the external pressure applied thereto as a result of fluid under pressure having entered the liner through an opening in an end wall of the liner. The degree to which the valve can open the passage is controlled by an eccentric cam which is operable by a knob from externally of the casing. A modification is disclosed in which a number of bags can be mounted on a single plate, the plate having a plurality of passages in it and the arrangement being such that the valve associated with any selected one of the passages can be brought into a position in which it is urged by the flowing fluid into the open position.

7 Claims, 3 Drawing Sheets

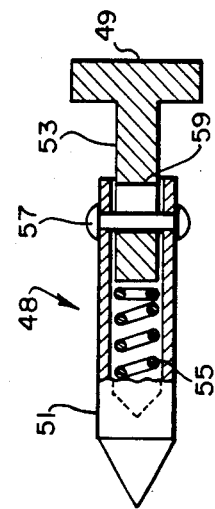
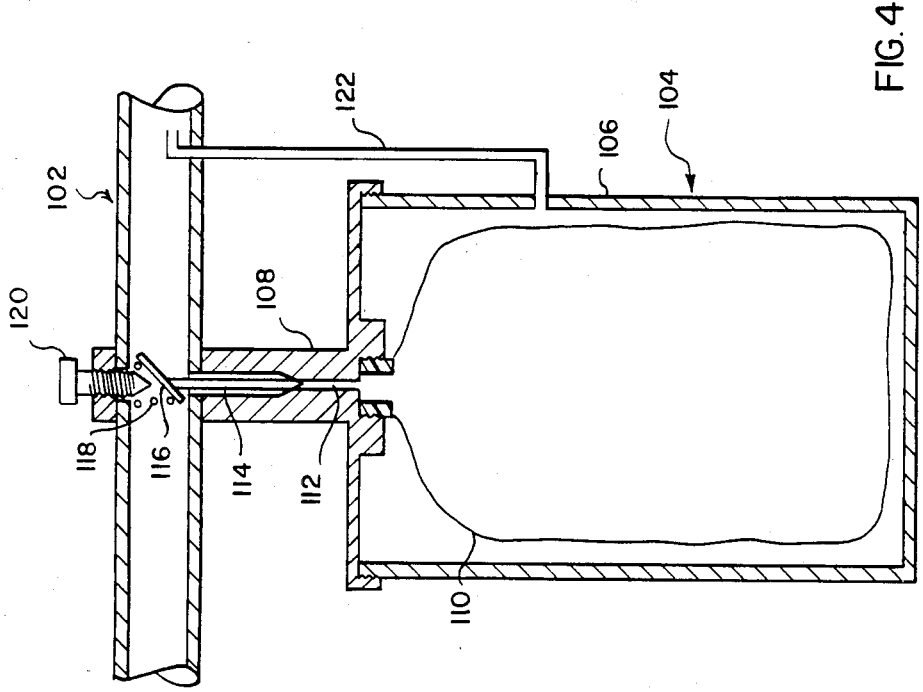

DEVICE FOR DOSING A FLOWING FLUID

This invention relates to a device for dosing a flowing fluid.

BACKGROUND TO THE INVENTION

Many devices have been proposed the purpose of which is to dose a flowing fluid with an additive. The additive may be added to water for purification purposes, or may be a fertilizer, herbicide or other substance added to irrigation water. It may also be a lubricant added to the air flowing to pneumatic apparatus.

Devices which make use of a collapsible bag on which the following fluid impinges are known from U.S. Pat. Nos. 3,724,601 and 4,212,373. In neither of these constructions is any provision made for enabling the rate of flow of additive to be adjusted, nor for compensating for variations in the rate of flow of the fluid, nor for preventing the bag filling with flowing fluid after the air or water supply has been switched off.

The present invention seeks to provide devices of the general type described above, which are of more sophisticated form and have more useful operating characteristics.

BRIEF DESCRIPTION OF THE INVENTION

According to one aspect of the present invention there is provided a device for dosing a flowing fluid which comprises a casing having an inlet for the fluid and an outlet for the fluid, means within the casing defining a fluid flow path leading from said inlet to said outlet, a passage within said casing along which additive flows from a supply of additive to said fluid flow path, a control valve in said passage, the control valve including an element which is in said flow path and is so positioned that, when fluid is flowing along said path, it impinges on said element and urges the valve in the direction which opens said passage.

Means, eg an eccentric cam rotatable from outside the casing, can be provided for limiting movement of the valve in the opening direction, and for varying the distance through which the valve can move in the opening direction. The valve is preferably a needle valve with an enlarged head, said head constituting said element.

The additive supply can comprise a collapsible, thin walled bag or a container with rigid walls.

The casing can be cylindrical, said inlet being at one end of the cylindrical casing and the outlet at the other end of the cylindrical casing, and the device further including a cylindrical liner having a transverse wall at the inlet end of the casing, there being a cylindrical gap between said casing and said liner which gap forms part of the said flow path, and there being an inlet opening in said transverse wall, the other end of said liner being closed-off by a plate which is detachable from the liner and which has said passage formed therein, and which further includes means for mounting a collapsible, thin walled bag for containing an additive.

In another form said casing is cylindrical, said inlet being at one end of the cylindrical casing and the outlet at the other end of the cylindrical casing, and the device further including a cylindrical liner, the ends of the inner liner being closed-off by transverse walls, the transverse wall at the inlet end of the casing incorporating a one-way valve which permits fluid to flow into the liner, and the transverse wall at the other end of the liner having said passage in it.

According to a further aspect of the present invention there is provided a device for dosing a flowing fluid which comprises a casing having an inlet for fluid under pressure, a mounting, a collapsible, thin walled bag attached to said mounting, a passage leading from said mounting and communicating with the interior of said bag, means defining a path along which fluid under pressure flows, said inlet and said passage both being connected to said flow path with the passage joining said flow path downstream of said inlet, a valve for controlling flow through said passage, the valve including an element which lies in said flow path in such manner that flowing fluid acts on said element to urge the element in the direction which opens said passage.

For a better understanding of the present invention, and to show how the same may be carried into effect, reference will now be made, by way of example, to the accompanying drawings in which:

FIG. 4 is a diagrammatic elevation of a further form of dosing device; and

FIG. 5 is a section, partly in elevation, through a needle valve.

Figure 1:
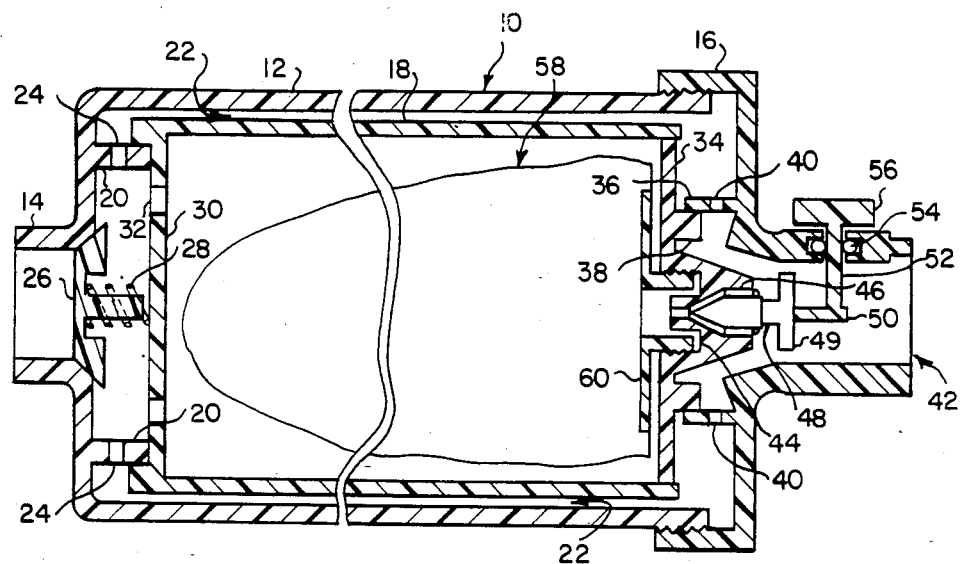
FIG. 1 is an axial section through a device for dosing a flowing fluid.

Referring firstly to FIG. 1, the dosing device illustrated comprises a casing generally designated 10 and which includes a cylindrical main body 12 having an inlet 14 at one end thereof, and a cap 16 which screws onto the main body 12 at the end thereof remote from the inlet 14. Within the body 12 there is a liner 18 which is secured to an internal mounting flange 20 forming part of the body 12. There is a cylindrical gap 22 between the inner face of the body 12 and the outer face of the liner 18, and this gap is placed in communication with the inlet 14 by way of openings 24 in the flange 20.

A non-return valve 26 is urged by a spring 28 into the inlet 14, the spring 28 seating on a transverse end wall 30 of the liner 18. An opening 32 in the end wall 30 places the inlet 14 in communication with the interior of the liner 18 when the valve 26 is open.

A circular plate 34 is entered in the open end of the liner 18. The cap 16 and plate 34 include mounting flanges 36, 38 respectively, and there are radially extending screws or other fastening elements (not shown) connecting the flanges 36, 38 together. The flange 36 has a number of openings 40 therein which place the gap 22 in communication with the outlet of the device, the outlet being designated 42 and forming part of the cap 16. There is a narrow annular gap between the periphery of the plate 34 and the liner 18.

The plate 34 has an internally threaded socket 44 therein, and a passage 46 leads from the socket 44 through the plate 34. The passage 46 includes a generally conical section intermediate its ends and a needle valve 48 seats on this conical section. The valve 48 (see particularly FIG. 5) comprises two telescopic parts 51 and 53 with a spring 55 inside the part 51. The spring 55 urges the parts 51 and 52 away from one another. A pin 57 passes through opposed bores in the part 51 and through an axially elongate slot 59 in the part 53. The pin 57 limits the range through which the parts 51 and 53 can move relatively to one another. The valve 48 has an enlarged head 49 which is within the outlet 42.

An eccentric cam 50 is mounted on a shaft 52 which passes through the wall of the outlet 42. A seal 54 surrounds the shaft 52 and there is a knob 56 on the outer end of the shaft 52. When the knob 56 is turned, the distance between the head 49 of the needle valve 48 and the cam 50 is altered so that the degree to which the needle valve can open can be adjusted from externally of the device.

Reference numeral 58 designates a bag of sheet synthetic plastics material, there being a combined spigot and flange 60 secured to the bag e.g. by welding or heat sealing. The spigot of the combined spigot and flange 60 is externally threaded, its threading being compatible with the threading of the socket 44.

In an alternative form the threading of the spigot of the bag 58 is replaced by an external annular rib and the threading of the socket 44 by an internal groove. The recess and groove snap-fit together as the bag's spigot is pushed into the socket 44 to form a leak-proof connection. The bag can be manufactured by a blow-moulding process which means that it is entirely in one piece and has a wall closing-off the spigot of the combined spigot and flange 60. Filling and sealing of the bag take place at the end remote from the combined spigot and flange 60. To puncture this wall and open the bag, the protruding part of the plate 34 which encircles the entrance to the passage 46 can be provided with a circular cutting edge which can be serrated. Any other formation on the protruding part of the plate 34 which will cut through the bag wall can be used.

In use the dosing device has inlet and outlet hoses (not shown) connected to the inlet 14 and outlet 42. Water under pressure enters through the inlet 14 and opens the valve 26 against the action of the spring 28. Water flows through the openings 24 into the annular gap 22 and then through the openings 40 to reach the outlet 42. Simultaneously, the interior of the liner 18 is pressurised by water which enters through the opening 32 in the end wall 30. The pressure within the liner tends to collapse the bag 58. Simultaneously, water flowing past the head 49 of the needle valve 48 acts on the head and urges the valve back against the cam 50. The force on the head 49 pulls the part 53 back but not normally to the extent that the pin 57 reaches the end of the slot 59 in the part 53. Th excess pressure in the liner 18, and which acts to squeeze additive out of the bag, is determined by the size of the annular gap between the plate 34 and the liner 18 through which water escapes into the main flow path. The liquid additive in the bag 58 thus feeds through the passage 46 and is carried away in the flowing water. To increase the rate of dosage, the knob 56 is turned so as to move the cam 50 further away from the plate 34. The needle valve 48 is thus urged further to the right by the flowing water. To decrease the rate of dosage the knob 56 is turned in the opposite direction. This tends to compress the spring 55 which then urges the part 51 to the left thereby reducing the effective area through which additive can flow. The force exerted on the part 51 by the pressurized additive and the force exerted by the spring 55 balance one another and the part 51 remains in the position which gives the correct flow rate.

The shape of the part of the water flow path downstream of the openings 40 is such as to create a convergence effect at the outlet from the passage 46. There is thus a low pressure at the outlet from the passage 46 which facilitates flow of additive into the water.

When dosing is to cease, the cam 50 is turned so that the needle valve is urged as far as possible to the left. The spring 55 causes the part 51 to seat firmly in the conical section of the passage 46 thereby preventing water flowing into the bag 58. Such water would dilute the contents of the bag and prevent accurate dosing thereafter.

When it is necessary to replace the bag 58, the end cap 16 and plate 34 are detached from the main body 12, and the bag 58 then unscrewed from the socket 44. A fresh bag (containing the same or a different additive) can then be screwed into the socket 44 and the cap 16 re-attached to the main body 12.

Intermittent pressure increases cause the pressure on the bag to increase in a corresponding manner. The additive thus tends to feed out under greater pressure and displaces the part 51 thereby to provide a flow path of increased area. This makes extra additive available to compensate for the sudden increases in flow rate. The position normally occupied by the needle valve 48 is chosen to give average flow rates, movement of the part 51 compensating for variations.

Figure 2:
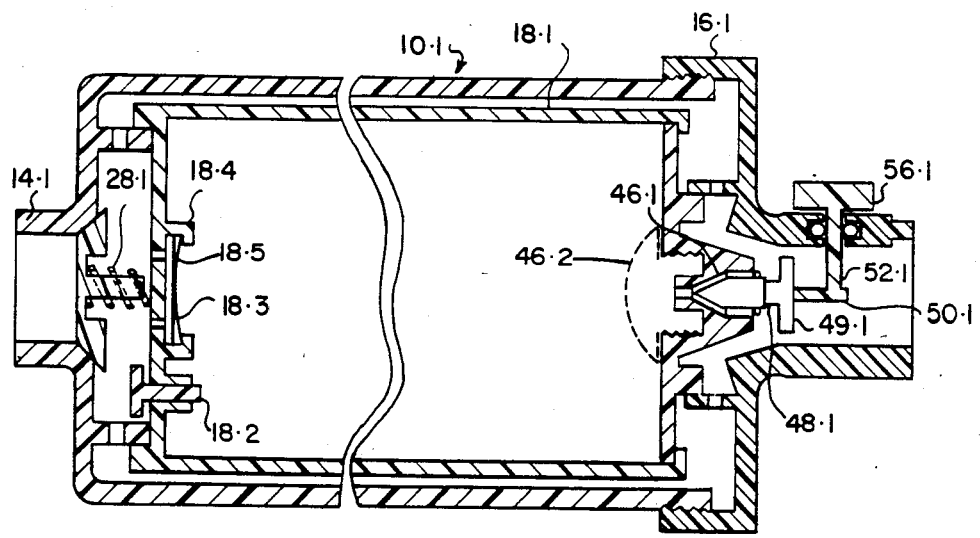
FIG. 2 is an axial section through a modified form of the device of FIG. 1.

The embodiment of FIG. 2 has much in common with the embodiment of FIG. 1 and, where applicable, like reference numerals have been applied with the addition of the suffix '.1'. In this form the bag 58 is omitted and it is the liner 18.1 itself which serves as a receptacle for the material to be added to the flowing water. In the base of the liner 18.1 of FIG. 2 there is a plug 18.2 which is a press fit in a filling aperture. In addition there is a loose plate 18.3 which is retained by means of a peripherally extending cage 18.4. A light leaf spring 18.5 urges the plate 18.3 to the left, that is, into its closed position. Water, at a controlled rate, enters the liner 18.1 around the edges of the plate 18.3 and dissolves the additive, which can be in particulate or solid form, carrying it through the passage 46.1 and into the flowing water stream. A light screen 46.2 is provided across the outlet to prevent particles passing through that can interfere with operation of the valve 48.1. If the additive is in liquid form, then it is sucked through the passage 46.1 whereupon the plate 18.3 moved to the right to facilitate flow of water into the liner.

In a modified form the cams 50 and 50.1 and the associated shafts and knobs are replaced by a screw which passes through a tapped bore in a spider located in the outlet 42. The tip, or the head, of the screw co-operates with the valve head 49, 49.1. To facilitate accurate adjustment of the valve position, a series of different screws can be provided, each screw being of a different length or different head thickness to the others. To change the flow rate, a new screw is simply substituted for the existing one.

Figure 3:
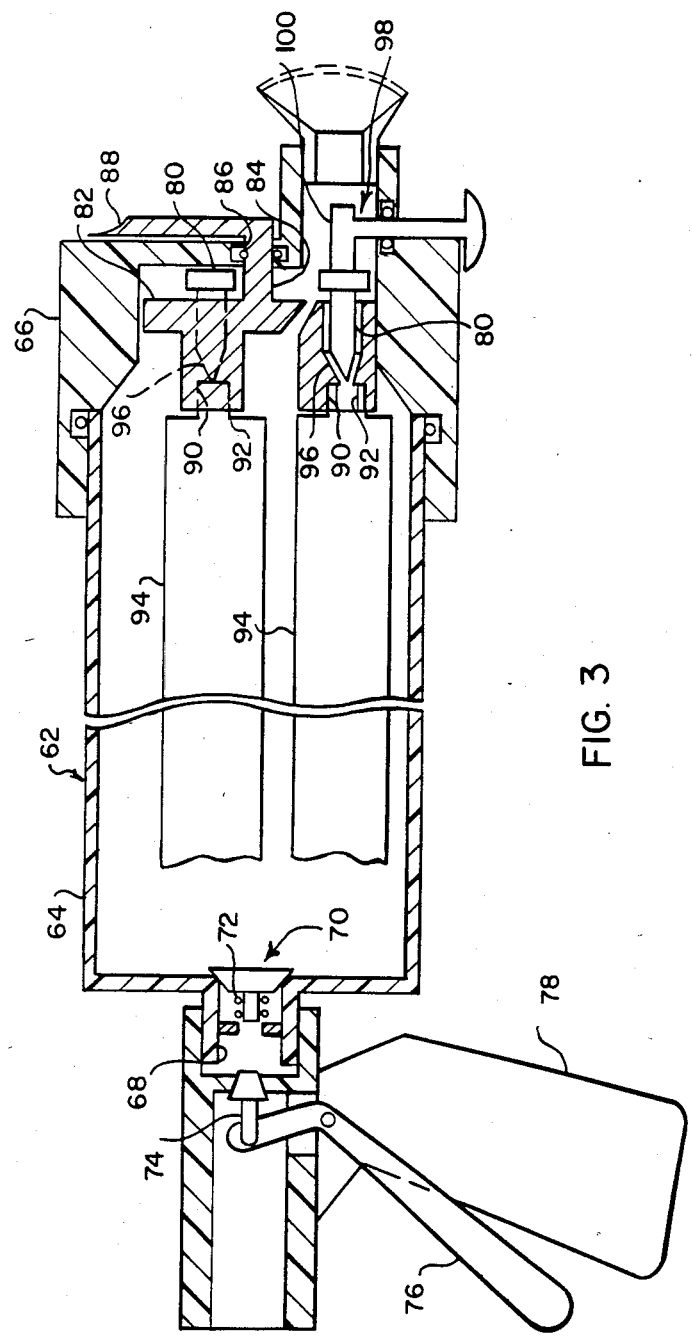
FIG. 3 is an axial section through a device for dosing a flowing fluid with a selected one of a number of additives.

In FIG. 3 there is illustrated a device for dosing a flowing fluid which comprises a casing 62 consisting of a cylindrical body 64 and an end cap 66. The body 64 has an inlet 68 at one end thereof, there being a valve 70 in the inlet 68. A spring 72 acts on the valve 70. Upstream of the valve 70 there is a manually operated valve 74, the valve 74 being attached to a lever 76 which, when squeezed towards a fixed member 78, causes the valve 74 to open.

Three needle valves 80 (only two of which are visible) are mounted on a rotatable control plate 82 which is co-axial with, and integral with, a shaft 84. Th shaft 84 passes through an opening 86 in the centre of the end cap 66. A seal encircles the shaft 84 and there is a control arm 88 attached to the outer end of the shaft 84 and extending radially. The valves 80 are preferably of the form shown in FIG. 5.

The plate 82 is formed with three sockets 90 (only two of which are visible) equivalent to the sockets 44 of FIGS. 1 and 2. Each of these sockets has the spigot 92 of a bag 94 in it. It will be noted that there are passages 96 leading from each socket 90, the needle valves 80 controlling flow through the passages 96. The three needle valves 80 and the sockets 90 are arranged in a circular array around the axis of the body 64 and are equally spaced from one another.

It will be noted that the needle valve 80 which is in the 'bottom dead centre' position lies in the outlet designated 98 and co-operates with a cam 100. This valve can thus be allowed to open by turning the cam 100. This permits the flowing fluid to open the valve. The other two needle valves are prevented from moving off the seats of the passages 96 by the end wall of the cap 66. Consequently, when the valve 74 is opened, additive emerges from the lowermost bag 94. To change-over to another additive, it is merely necessary to rotate the plate 82 by means of the control arm 88. This bring another one of the valves 80 into the bottom dead centre position.

If all three valves 80 are held closed by means of the cap 66, then the water flowing through is not 'dosed' with any of the additives.

The inner face of the end wall of the cap 66 is aligned with the edge of the cam when the cam is in the position which closes-off the valve associated with it. The gaps on each side of the cam between it and the end wall of the cap 66 are small. Thus as the plate 82 is rotated with the cam in its closed position, the heads of the valves 80 move off the end cap and onto the cam and vice-versa without moving axially.

Turning finally to FIG. 4, this illustrates a dosing device which is attached to a length of pipe 102. It will be assumed that water flows through the pipe 102 from right to left. Attached to the pipe 102 is a two-part casing 104. The casing 104 includes a cylinder 106 and a top plate including a spigot 108. Within the casing 104 there is a collapsible bag 110. A passage 112 extends through the spigot 108 and there is a needle valve 114 for controlling flow through the passage 112. The needle valve 114 co-operates with a seat inside the passage 112 and has an inclined deflector plate 116 at the upper end thereof. The plate 116 is within the pipe 102. A spring 118 urges the valve to its closed position, and there is an adjusting screw 120 for limiting the distance through which the valve 114 can move when it opens.

To pressurise the casing 104, and hence cause collapse of the bag 110, there is a tube 122 which leads from the pipe 102 into the casing 104. It will be noted that the entrance to the tube 122 is directed upstream.

In use of this dispenser, water flowing along the pipe 102 impinges on the underside of the deflector plate 116 and there is thus an upward force which tends to open the valve 114. Simultaneously, water flows through the tube 122 and into the casing 104. Inward pressure on the bag 110 expels liquid from the bag along the passage 112 and past the valve 114 into the flowing water. When water ceases to flow, the spring 118 re-closes the valve 114.

If desired the plate 116 can slope in the opposite sense so that the flowing water tends to depress the needle valve 114. The valve seat in this form can be downwardly facing, the needle valve 114 moving down away from the seat to initiate flow. The spring 118 in this form lifts the needle valve 114 to close-off along the passage 112.

While in the above description reference has been made to water as being the liquid which flows through the devices described, any other liquid or air can be dosed.

Where air is being dosed the various needle valves described, upon the supply of air being shut-off, close-off the flow passages and prevent air leaking back into the bag which at that time is in use. Should air be allowed to leak into the bag then this air must be expelled from the bag when the device is re-used, which means that flow of additive is delayed until such time as all the air has been removed. Leakage of the additive is also prevented by closing of the needle valves.

I claim:

1. A device for dosing a flowing fluid which comprises a casing having an inlet for the fluid and an outlet for the fluid, means within the casing defining a fluid flow path leading from said inlet to said outlet, a passage within said casing along which additive flows from a supply of additive to said fluid flow path, a control valve in said passage, the control valve including an element which is in said flow path and is so positioned that, when fluid is flowing along said path, it impinges on said element and urges the valve in the direction which opens said passage, and means operable from externally of the casing for limiting movement of the valve in the opening direction, and for varying the distance through which the valve can move in the opening direction.

2. A device for dosing a flowing fluid which comprises a casing having an inlet for the fluid and an outlet for the fluid, means within the casing defining a fluid flow path leading from said inlet to said outlet, a passage within said casing along which additive flows from a supply of additive to said fluid flow path, a needle valve in said passage, the needle valve comprising first and second parts which are telescopically movable with respect to one another, there being a spring which urges said parts in the direction which tends to separate them from one another, one of said parts including an element which is in said flow path and is positioned so that, when fluid is flowing along said path, it impinges on said element and urges said one part in the direction with tends to separate said parts from one another.

3. A device according to claim 1, in which said means comprises an eccentric cam rotatable from externally of said casing.

4. A device according to claim 1 or 2, in which said casing is cylindrical, said inlet being at one end of the cylindrical casing and the outlet at the other end of the cylindrical casing, and the device further including a cylindrical liner having a transverse wall at the inlet end of the casing, there being a cylindrical gap between said casing and said liner which gap forms part of the said flow path, and there being an inlet opening in said transverse wall, the other end of said liner being closed-off by a plate which is detachable from the liner and which has said passage formed therein, and which further includes means for mounting a collapsible, thin walled bag for containing an additive.

5. A device according to claim 1 or 2, in which said casing is cylindrical, said inlet being at one end of the cylindrical casing and the outlet at the other end of the cylindrical casing, and the device further including a cylindrical liner, the ends of the inner liner being closed-off by transverse walls, the transverse wall at the inlet end of the casing incorporating a one-way valve which permits fluid to flow into the liner, and the transverse wall at the other end of the liner having said passage in it.

6. A device according to claim 1 or 2 and including a plurality of said passages and a plurality of control valves, each passage leading to a mounting for a supply of additive whereby the casing may contain supplies of more than one additive, and means for selectively bringing one of the plurality of valves at a time into said flow path while holding the others shut.

7. A device according to claim 1 or 2, and including a rotatable plate within the casing, said plate having a plurality of passages in it and there being a valve for controlling flow through each passage, the plate further including mountings for enabling containers having additives therein to be mounted on said plate in register with said passages, and a surface for holding said valves in the position in which they close-off said passages, said plate being rotatable to bring a selected one of said valves into said flow path while holding the others shut.

* * * * *